(No Model.) 3 Sheets—Sheet 1.

G. P. SALTENBERER.
COTTON HARVESTER.

No. 418,385. Patented Dec. 31, 1889.

WITNESSES
Fred G. Dieterich
Jos. A. Ryan

INVENTOR
George P. Saltenberer
BY
Munn & Co
ATTORNEY (No Model.) 3 Sheets—Sheet 2.
G. P. SALTENBERER.
COTTON HARVESTER.
No. 418,385. Patented Dec. 31, 1889.
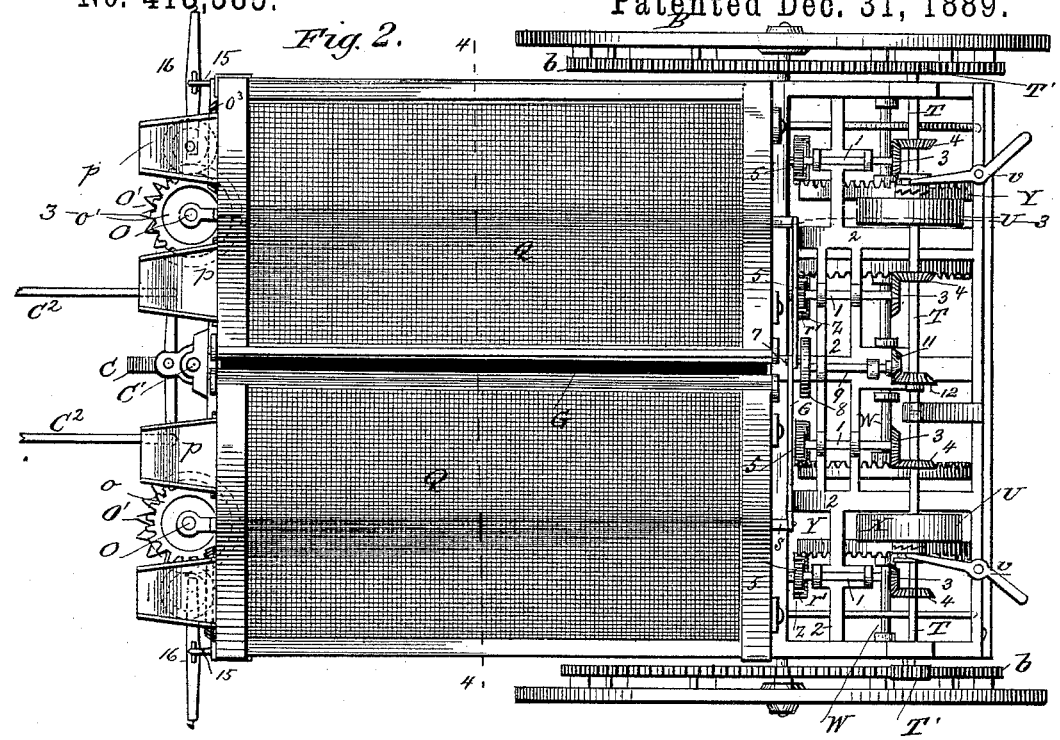
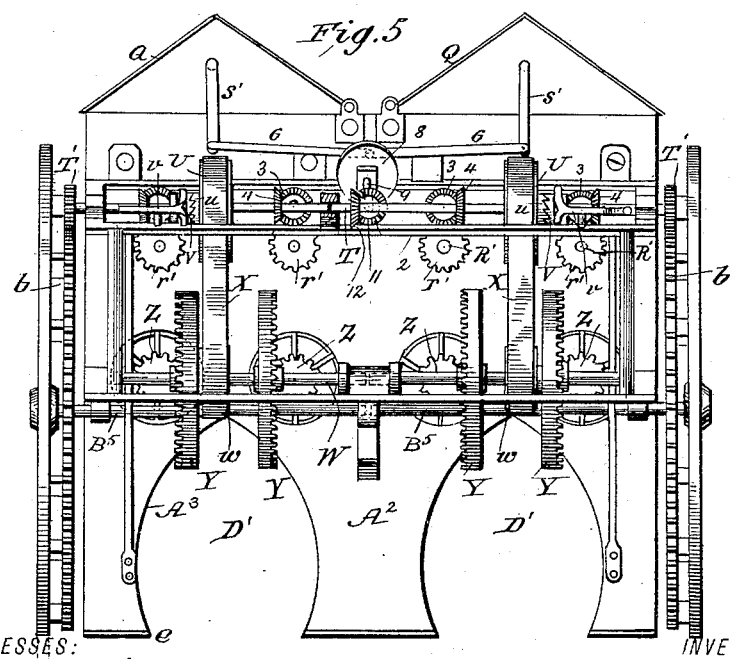
WITNESSES:
Fred J. Dieterich
Jos. A. Ryan
INVENTOR
George P. Saltenberer
BY Munn & Co.
ATTORNEY (No Model.) 3 Sheets—Sheet 3.
G. P. SALTENBERER.
COTTON HARVESTER.
No. 418,385. Patented Dec. 31, 1889.
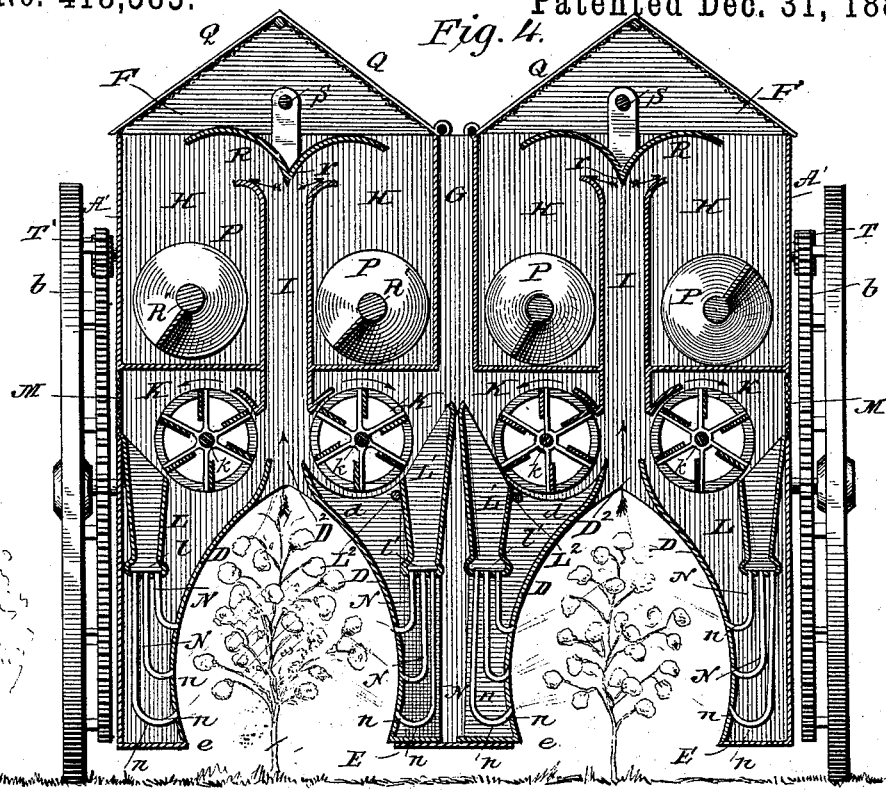
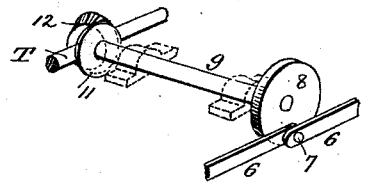
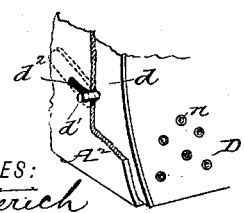
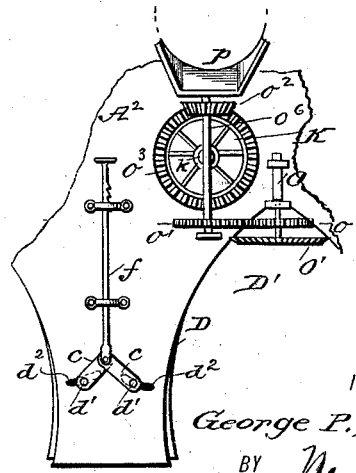
WITNESSES:
Fred G. Dieterich
Jos. A. Bryan
INVENTOR
George P. Saltenberer.
BY Munn & Co
ATTORNEY
N. PETERS, Photo-Lithographer, Washington, D. C.

UNITED STATES PATENT OFFICE.

GEORGE P. SALTENBERER, OF LAKEPORT, ARKANSAS, ASSIGNOR OF ONE-HALF TO WILLIAM W. FORD, OF SAME PLACE.

COTTON-HARVESTER.

SPECIFICATION forming part of Letters Patent No. 418,385, dated December 31, 1889.

Application filed December 21, 1888. Serial No. 294,312. (No model.)

*To all whom it may concern:*

Be it known that I, GEORGE P. SALTENBERER, residing at Lakeport, in the county of Chicot and State of Arkansas, have invented certain new and useful Improvements in Cotton-Harvesters, of which the following is a specification.

My invention relates to that class of cotton-harvesters in which an air-blast is employed that forces the ripe bolls of cotton upward into a receiving-chamber; and it consists in the peculiar construction and combination of parts, which will be more fully set forth hereinafter, and particularly pointed out in the claims, reference being had to the accompanying drawings, in which—

Figure 1:
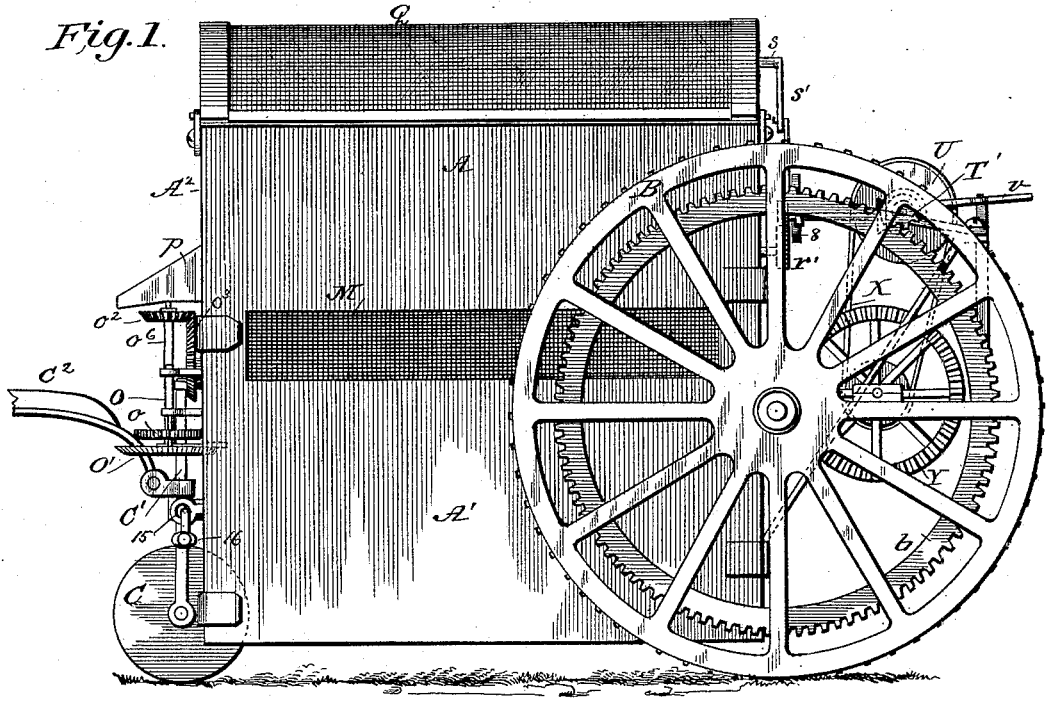
Figure 3:
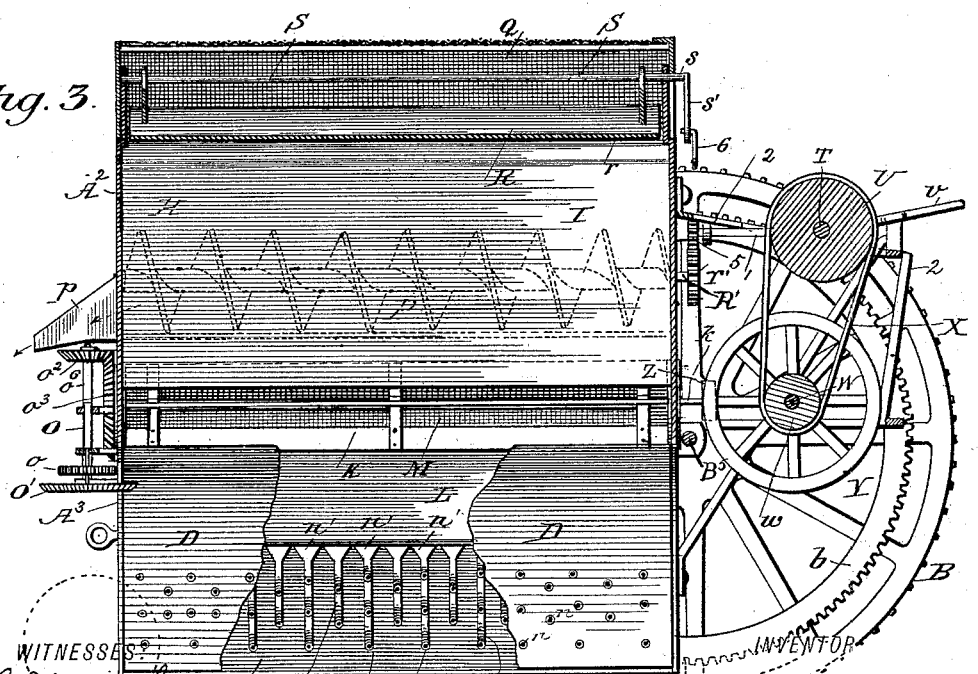

Figure 1 is a side view of my improved cotton-harvester. Fig. 2 is a top plan view thereof. Fig. 3 is a longitudinal section of the same on the line 3 3, Fig. 2. Fig. 4 is a transverse section on the line 4 4, Fig. 2. Fig. 5 is a rear view thereof; and Figs. 6, 7, and 8 are detail views, hereinafter referred to.

In the practical construction of my improvement I form a hollow casing A, which is of a width sufficient to extend over two rows of cotton, and is mounted at its rear end upon the drive-wheels B B and at its central forward portion upon a caster or steering wheel C. The casing A is formed preferably of sheet metal, the sides or side walls A' of which extend down to the bottom of the machine, which in operation is disposed just above the ground. The ends or end walls $A^2$ also extend to the bottom of the machine, but are provided at their lower portions with arched openings or cut-away portions $A^3 A^3$, which are of a height sufficient to travel over the cotton-stalks.

D denotes longitudinal side walls, which connect with the front and rear openings or cut-away portions $A^3$, thereby forming continuous inverted passage-ways D', which extend over the two rows of cotton-stalks when the machine is in operation.

E denotes the bottom of the casing, which is connected with the side and end walls of the casing and provided with cut-away portions e e, which register with the cotton-plant passage-ways D'.

The upper part of the casing A is provided with two longitudinal chambers F F, disposed one each above the passage-ways D', which are divided by a central longitudinal opening G, the purpose of which will be hereinafter explained. Each of the chambers F F is divided into two chambers or receiving-hoppers H, which are divided by central longitudinal openings or flues I I, which register with the longitudinal opening $D^2$, formed by the tops of the side walls D. At the lower ends of the flues I I, to each side of and near the top edges of the openings $D^2$, are located longitudinally-revolving fans or blowers K, which are journaled at their ends in the front and rear walls of the casing, the shafts $k$ of which project rearwardly and are connected with the drive mechanism, in a manner as will be presently explained. Longitudinal air-troughs lead from the edge of each of the fans, which project downwardly a short distance. The upper ends of the outer troughs L L connect with air-inlets M, formed in the side walls A' A' of the casing, while the inner troughs L' L' have their upper ends disposed so as to receive the air-current from the central opening G, which constitutes the air-inlet for the two inner fans. A series of small pipes or tubes N connect at their upper ends with the bottoms $l\,l'$ of the troughs, the lower ends $n$ thereof being connected with and projected through the side walls D of the passage-ways D'.

To more readily receive the full current of air, the upper ends of the pipes are widened longitudinally, as at $n'$. (See Fig. 3.)

To direct the air-blast in an upward direction, the lower ends $n$ of the pipes are turned upwardly to an angle of about forty-five degrees, and to force the same out with increased force the lower ends thereof are formed with small discharge-openings.

To permit of the adjusting of the passage-ways D', the troughs L' L' have a pivot-bearing $L^2 L^2$, and are connected by extensions or wing portions $d\,d$ with the walls D.

$d'\,d'$ denote studs connected to the front wings or extensions $d\,d$, which project through slots $d^2\,d^2$ in the front wall of the casing, and each is connected to one of the toggle-levers $c\,c$, the inner ends of which are connected to a vertically-sliding lever $f$. (See Fig. 6.) By this construction it will be seen that as the lever $f$ is moved up or down the walls D D and the troughs L' L' may be moved inwardly or outwardly, thereby adjusting said passage-ways D' to accommodate cotton-rows of different widths.

O O denote short vertical shafts journaled on the front wall $A^2$, over the apex of the passage-ways D', which have secured upon their lower ends horizontal saws O' O', which operate just below the apex of the ways D'. Said shafts are each provided with a gear-wheel $o$, which engages a gear $o'$ on a shaft $o^6$, mounted upon the front wall $A^2$, which is provided with a bevel-gear $o^2$, mounted upon its upper end, engaging a bevel-gear $o^3$, mounted upon the forward ends of the fan-shafts.

The object of the saws O' O' is to cut off the tops or dead branches of the plants and permit the same to fall to the ground before the air-blast reaches them, and thus prevent the same from being carried upward and clogging the flues I.

Journaled in the end walls of the casing and disposed in the bottom portion of the receiving-hoppers H are screw conveyers P P, with spouts $p\ p$ at their front ends, which extend beyond the front wall $A^2$, and may have secured thereto the bags or other receptacles for receiving the cotton. The rear ends of the conveyers are connected to and operated by the driving-gears in a manner as will hereinafter be described.

Each of the chambers F F is provided with a screen-cover Q Q, hinged at the upper edges thereof.

R R represent shields secured upon longitudinal rock-shafts S S, journaled one each in the chambers F. These shields are formed of a longitudinal plate formed of two sections, each approximately formed in the arc of a circle, as most clearly shown in Fig. 4, the ridges $r$ of which are disposed centrally over the flues I.

The object of placing the shields over the flues I is for the purpose of preventing the cotton from being blown up against the cover and clogging against the same.

By securing the shields to a rock-shaft, so the same may be oscillated, they will be alternately swung so as to first close one edge of the upper end of the flue I and then the other, and thereby form a continuous flue to carry the cotton alternately first to one hopper H and then to the opposite hopper. By this construction it will be seen that a clean passage or flue is always formed, so that it will be impossible for any of the cotton to choke up the upper end of the same.

The gearing devices for operating the several parts described, which are most clearly shown in Figs. 2 and 5 of the drawings, are constructed as follows: The drive-wheels B, which are mounted on a divided axle $B^5$, so as to permit the machine to make short turns, are provided with circular cog-rims $b\ b$ upon their inner faces, which mesh with cog-gears T' T' upon a transverse divided shaft T, mounted behind the casing. Loosely mounted on the shaft T are chain or belt pulleys U U, provided with clutch-disks $u\ u$, with which are adapted to be engaged sliding clutches V V, which are operated on said shafts by the clutch-levers $v\ v$, as shown. Chains or belts X are passed about the pulleys U U and over pulleys $w\ w$, mounted on a transverse divided shaft W, journaled behind the casing, upon which are mounted cog-gears Y Y, which mesh with gears Z Z upon the ends of the fan-shafts. Short longitudinal shafts 1 1 are journaled in the supporting-frame 2, secured to rear of the casing, which have bevel-gears 3 on the outer ends, which engage similar gears 4 on the shaft T. They are also provided with bevel-gears 5 on their inner ends, which engage bevel-gears $r'$ upon the ends of the conveyer-shafts R'. The rear ends of the rock-shafts S are extended, as at $s$, and are provided with downwardly-depending arms $s'$, (see Fig. 1,) to which are connected one end of links or rods 6 6, the opposite ends of which are connected to a wrist-pin 7 on a disk 8, mounted upon a short longitudinal shaft 9, journaled in the frame 2, which is provided with a bevel-gear 11, engaging a similar gear 12 upon the shaft T. By this means, as the shaft T is revolved, motion is imparted to the shaft 9 and disk 8, and the arms $s'$ are through the connecting-links 6 6 alternately swung laterally, thereby causing the shields to oscillate for the purpose before stated.

The caster-wheel C, previously referred to, is journaled in the lower end of a vertical standard C', journaled to the front and at the center of the case A, and to this standard is connected a pair of shafts $C^2$. By this means it will be seen that when the same are swung to either side they will turn the standard C' in its bearing, and thereby adjust the steering-wheel or caster C.

To the outer edges of the casing, as at 15, are connected singletrees 16, as shown.

The operation of the machine is as follows: In applying the draft to the machine three horses are attached thereto, one between the shafts and one to each of the singletrees. Thus one animal travels between the rows to be operated on and one to each outer side thereof. As the machine is advanced, the drive-wheels B B will impart motion to the gearing devices, and thereby operate the different parts of the machine, as before stated. The saws as they pass over the cotton-plants cut away the projecting limbs and dead branches in advance of the air-blast and permit them to fall to the earth. The fans, being in operation, draw in a current of air through the central opening G, and the inlets or side openings M M force the same down into the longitudinal troughs L and through the pipes N N, from the lower ends of which it escapes, and is forced upward in swift currents against the cotton-bolls, forcing the ripe cotton from the plant upward through the longitudinal flues I into the hoppers H. The movement of the cotton into said hoppers is greatly facilitated by the assistance of the oscillating shields R, which are operated in a manner previously described. The revolution of the conveyers P P continuously discharges the cotton into a receptacle at the front of the machine, and thereby prevents the said hoppers from becoming clogged with too much cotton.

While I have shown my invention applied as a machine adapted to operate two rows of cotton at one time, it is manifest that the same may be modified so as to operate on but one row without departing from my invention. It is also obvious that the outer side walls D of the passage-ways D' and troughs L may be made adjustable, if desired.

From the foregoing description, taken in connection with the drawings, the operation and advantages of my improved machine will be readily understood. Its construction is such as to admit of its being built at a reasonable cost, its operation is simple, and its capacity far greater than that of similar machines now in use.

Having thus described my invention, what I claim as new is—

1. In a cotton-harvester, the hollow case A, provided with arched openings in the lower portion of its front and rear ends, longitudinal side walls connecting the ends at the edges of said openings, forming passage-ways D', vertical flues disposed above and communicating with said passage-ways, receiving-hoppers formed at the upper end of and at each side of the flues, air-inlets formed in the casing, blower-fans journaled in said casing, air-jet tubes leading from the fans into said passage-ways, horizontal saws journaled upon the front of the casing operating at the tops of the front openings $A^3$, and gear-connections between said saws and the fan-shafts, all arranged substantially as shown, and for the purpose described.

2. In a cotton-harvester, the hollow case A, provided with arched openings $A^3$ in the lower portion of its front and rear ends, longitudinal side walls connecting the ends at the edges of the said openings, forming passage-ways D', openings $D^2$, formed in the tops of the ways D', vertical flues disposed above and communicating with the openings $D^2$, receiving-hoppers H, formed at each side of and communicating with the upper end of each of the flues I, air-inlets in said casing, blower-fans journaled in said casing at each side of each of the openings $D^2$, air-pipes disposed in communication with said fans and projected through the lower portion of the side walls D, whereby the currents are forced in the passage-way against the plants, one of each pair of the fan-shafts projected at the front of the machine and provided with gears, and horizontal saws journaled upon the front of the machine, operating at the tops of the front openings $A^3$, the shafts of said saws provided with gears driven by the gears on the fan-shafts, and means for operating the fan-shafts, substantially as shown and described.

3. In a cotton-harvester, the hollow casing A, provided with openings $A^3$ in the lower portion of its ends, longitudinal adjustable side walls D D, forming cotton passage-ways D', openings $D^2$, formed at the tops of the ways D', vertical flues I, disposed above and communicating with the openings $D^2$, cotton-receiving hoppers disposed one upon each side of and communicating with the upper portion of each of the flues I, screw conveyers P, journaled in the lower portion of said hoppers, air-inlets in the casing, air-openings formed through the lower portion of the side walls D, blowers mounted within the casing for forcing the air through the openings in the side walls, and means for operating the blowers and conveyers, substantially as shown and described, as and for the purposes set forth.

4. In a cotton-harvester, the combination, with the hollow casing A, having longitudinal cotton passage-ways in its lower portion, air-openings formed in the side walls thereof, longitudinal openings $D^2$, formed at the tops of said passage-ways, the vertical flues I, communicating with the openings $D^2$, the hoppers H, formed one on each side of each of the flues and communicating therewith, screen covers or tops secured above the hoppers and flues, air-inlets in said case, and blowers mounted within the casing for forcing the air through the side walls D, of the oscillating shields R, pivotally supported above the discharge ends of the flues I, said shields adapted to conduct the cotton alternately to one hopper and then to the other, and means, substantially as shown, for operating the said shields and blowers, substantially as shown and described.

5. In a cotton-harvester essentially as described, the combination, with the main frame or casing provided with arched openings $A^3$ in its lower ends, of longitudinal side walls D, connecting the ends at the edges of said openings $A^3$, forming cotton passage-ways D', the inner walls D of said passage-ways provided with wing-extensions $d\,d$ at their ends, hinged to the end of the casing, means, substantially as shown and described, for adjusting said walls, hoppers mounted above the passage-ways, vertical flues connecting said passage-ways with the hoppers, discharge-openings formed in the side walls D, and blowers mounted in the casing for forcing the air through said openings, all arranged substantially as and for the purposes specified.

GEORGE P. SALTENBERER.

Witnesses:
J. F. JOHNSTON,
JEFF. P. PEAK.